United States Patent [19]

Erwin et al.

[11] Patent Number: 4,798,504
[45] Date of Patent: Jan. 17, 1989

[54] WORKPIECE MACHINING APPARATUS AND METHOD

[75] Inventors: Piepka Erwin; Wöllhaf Paul, both of Friedrichshafen; Gandbhir Subhash, Immenstaad, all of Fed. Rep. of Germany

[73] Assignee: Zahnradfabrik Friedrichshafen, AG., Friedrichshafen, Fed. Rep. of Germany

[21] Appl. No.: 855,622

[22] PCT Filed: Aug. 3, 1985

[86] PCT No.: PCT/EP85/00391
§ 371 Date: Apr. 10, 1986
§ 102(e) Date: Apr. 10, 1986

[87] PCT Pub. No.: WO86/01136
PCT Pub. Date: Feb. 27, 1986

[30] Foreign Application Priority Data

Aug. 17, 1984 [EP] European Pat. Off. ............ PCT/EP84/00253

[51] Int. Cl.⁴ ................................ B23F 5/26
[52] U.S. Cl. ...................... 409/2; 51/52 R; 51/287; 409/41; 409/50; 409/51
[58] Field of Search .......... 409/2, 25, 26, 31, 48, 409/56, 62, 1, 41, 50, 51, 52, 53, 204, 206, 211, 216, 12, 15, 57, 135, 136; 408/234; 51/105 G, DIG. 1, 287, 52 R, 56 G

[56] References Cited

U.S. PATENT DOCUMENTS

| | | | |
|---|---|---|---|
| 1,404,205 | 1/1922 | Jorgensen | 409/56 |
| 3,841,198 | 10/1974 | Comford | 409/2 |
| 3,916,569 | 11/1975 | Wydler et al. | 51/52 R X |
| 4,339,895 | 7/1982 | Fivian | 51/287 |
| 4,543,020 | 9/1985 | Shtipelman | 409/12 |

FOREIGN PATENT DOCUMENTS

| | | | |
|---|---|---|---|
| 1195969 | 11/1959 | France | 51/105 G |
| 0090223 | 7/1980 | Japan | 409/12 |

OTHER PUBLICATIONS

National Branch and Machine Co., Gear Grinding Becomes A Science, 3/24/67, FIG. 9.

Primary Examiner—Z. R. Bilinsky
Attorney, Agent, or Firm—Albert M. Zalkind

[57] ABSTRACT

Formations on a workpiece (1) are machined along an arcuate path (5) having a center (4) in eccentrically spaced relation to a rotational axis (3) about which the workpiece is indexed by a holder (2). A tool (7) is controllably displaced through its carrier (12) in such a manner as to establish radial alignment of the tool relative to the indexing axis and the path center during operational strokes to enable machining of identical formations spaced along the path. The radius of curvature of the path is greater than the maximum distance (4–14) to which said operational strokes are limited.

16 Claims, 2 Drawing Sheets

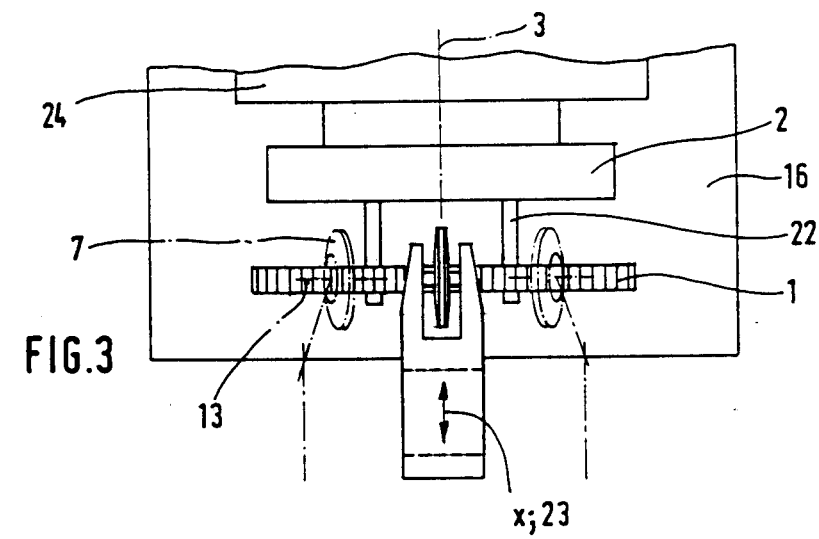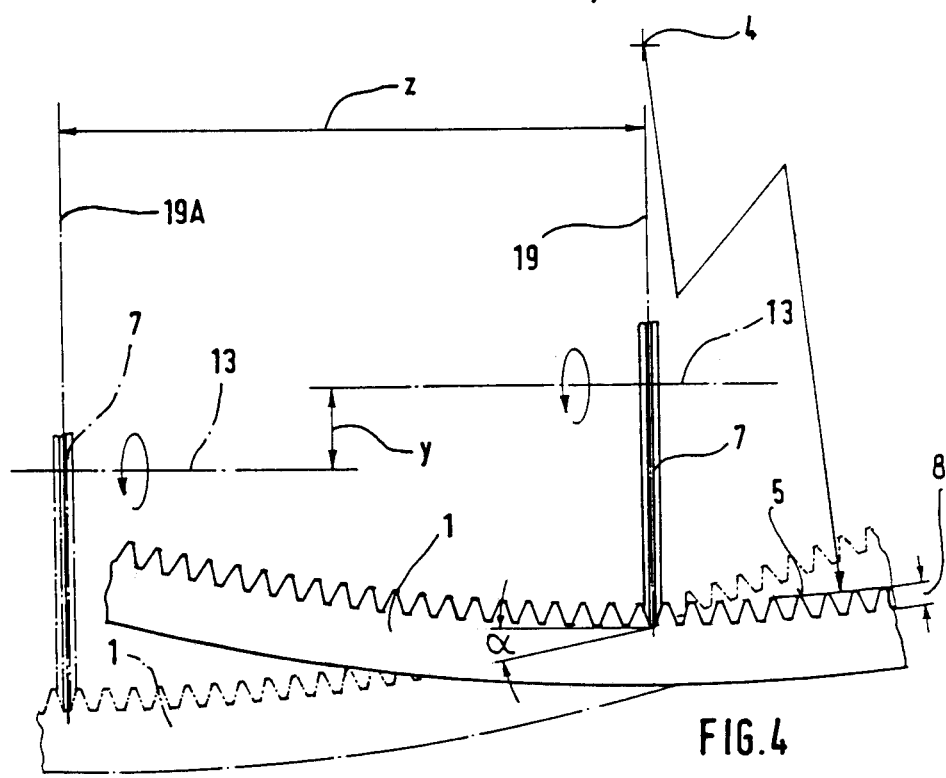

WORKPIECE MACHINING APPARATUS AND METHOD

BACKGROUND OF THE INVENTION

The invention relates to the machining of formations, such as gear teeth, spaced along a path having a predetermined curvature.

The grinding of gear tooth flanks is presently carried out on conventional machine tools with which problems arise in the machining of large gear wheels. In prior gear forming machines, the tool and workpiece are guided or fed relative to each other along curved paths having a common center of curvature so as to limit the maximum distance of the tool from the center of the formation path and therefore also the maximum size of the workpiece to be machined.

Workpieces having a machining formation path of a diameter larger than that accomodated by the conventional in-house machine tool have required the acquisition of expensive, special machines for infrequent use on larger workpieces with high investment costs and space requirements so that production costs become excessively high. Furthermore, the special machines for large workpieces did not even contribute significantly to improvement in machining precision, because of the large tool and table travel distances involved and the larger tolerance errors associated therewith. Also in view of the lack of precision the less demanding use of the special machines by preliminary machining of smaller formations on larger workpieces became more difficult.

It is therefore an object of the present invention to enlarge utilization of machine tool arrangements accomodating the prevailing workpiece dimensions by also accomodating with precision workpieces considerably larger than those capable of being handled by conventionally equipped machines, with only insignificant loss of time for adjustment of control movements.

SUMMARY OF THE INVENTION

The foregoing object of the invention is achieved by additional relative displacements between the tool and workpiece holder imparted by auxiliary drive arrangements in a direction perpendicular to the normal two directions of relative movement between the tool and the workpiece holder (synchronized by programmed control) and also in one of said two directions to establish and/or maintain radial alignment between the axis of the tool holder and the center of the arcuate path on the workpiece along which equally spaced, identical formations are machined by the tool. Thus, the workpiece and tool are relatively moved under control of eccentric motion programming of additional driving elements to shift the workpiece holder or feed in radial relation to the spacing between formations or tooth gaps along curved path segments. Such workpiece feed movement is limited only by the transverse stroke of the tool for a machining diameter of any desired size. Thus it becomes possible with correspondingly equipped driving elements and the additional programming control to machine larger workpieces as precisely as in the case of machines of customary size such as the conventional gear tooth cutting machines on which prevailing size workpieces or gear blanks are held in concentric relation to the gear axis as well as machines for workpieces held eccentrically for considerably larger gear diameters in which there is a corresponding radial distance between the tool holder axis and the gear machining center. Gear tooth segments and internal gears having large machining diameters may thereby be cut on machines capable of accomodating considerably smaller standard gear wheels. Since feeding movements may be imparted simultaneously for axis shifting, angular drive corrections and other angular corrections of machining operations, only insignificant loss of time is involved in the machining change from one tooth gap to the next. Thus, control of radial machining strokes is effected at each operating position, as is necessary for example in the machining of segmental grooves or gear teeth.

Heretofore, the maximum diameter of a gear blank to be machined was often determined by the available space in the workroom for gear cutting machines of different sizes. It is now possible to utilize one machine for cutting smaller diameter gears having centers which coincide with the workpiece holder axis and with a most simple changeover opera or gear teeth along curves, the radii of which are much larger or the curve centers of which no longer coincide with the workpiece holder axis. It will also be possible with equipment according to the present invention to fulfill conditions requiring tool operating strokes repeated precisely and parallel to radii extending from curve centers by distances that are changed with each operating position for the individual machining operations.

The arrangement according to the invention is not only suitable for conventional machining operations but also by way of example for welding, riveting and threading by machines customarily suitable for such other operations.

Instead of merely imparting controlled motion to the tool, relative motion between the tool and its holder may also be provided in accordance with the present invention.

BRIEF DESCRIPTION OF DRAWING FIGURES

Embodiments of the invention will be described schematically on the basis of the accompanying drawings, in which:

FIG. 3 is a partial top view of the arrangement of FIG. 2.

FIG. 4 is a machining diagram on an enlarged scale illustrating tool feed-in operations.

DETAILED DESCRIPTION OF PREFERRED EMBODIMENTS

Figure 1:
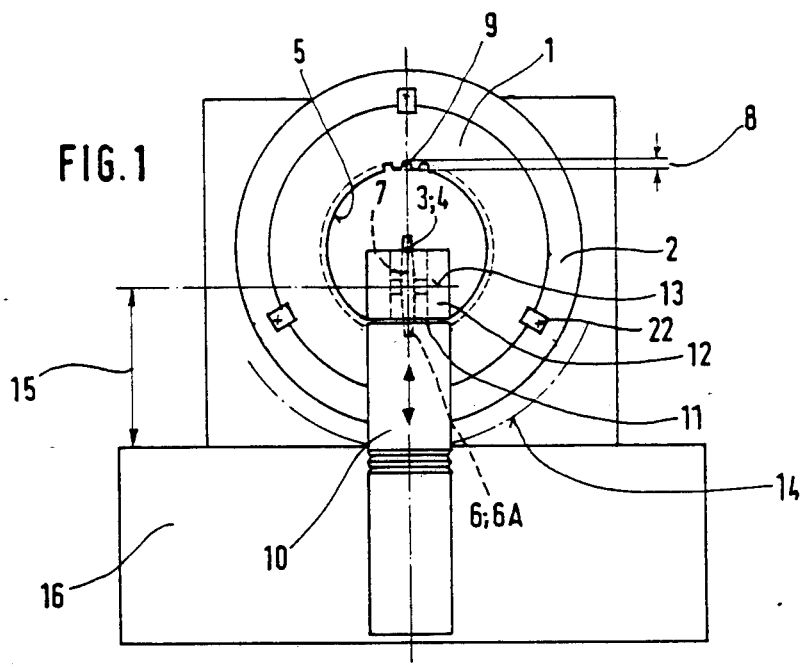
FIG. 1 is a front view of a prior art arrangement for the machining of workpieces chucked concentrically to the axis of its holder for certain machining diameters.

In FIG. 1, a machining arrangement is shown as used in accordance with the present state of the art to machine a workpiece 1 mounted on a holder 2 positioned by coordinates meeting at a common center 3 and 4 of the workpiece and holder, respectively. The operating position 6 of tool 7 lies on a predetermined curve 5. As shown, the curve 5 is circular with notches formed as grooves by the tool along an operating stroke 8, located in radial relation to the center 3 of the circular curve. At each of its operating positions 6, the tool 7 undergoes an operating stroke 8 in radial relation to center point 3 or 4 always in a direction of the corresponding groove 9. For such purpose, it is merely necessary to provide the tool 7, such as a milling cutter or grinder, with a driving element 10 vertically displacing the tool in one direction Y and a transversely shiftable driving element 12 displacing the tool in a horizontal direction X perpendicular to the viewing plane of FIG. 1 while the tool is undergoing its machining stroke within guide 11.

In the foregoing arrangement, the drive element 12 carries the rotary drive 13 for the tool 7. Since the workpiece 1 is in concentric relation to its holder 2, the holder need only be angularly displaced or indexed about the centers 3 and 4 by an amount corresponding to the spacing between the operating positions 6 and 6A. No further transverse or pivotal strokes are required. However, the largest machining diameter for the workpiece is limited to the diameter of the circular arc 14. Such maximum diameter of the circular arc 14 is limited by the height 15 of the tool above the bed 16 of the machine.

For special operations, such as widening or deepening the groove, it is possible to separately adjust the holder 2 and tool 7 transversely or vertically. However, such adjustments cannot enlarge the machining diameter.

Figure 2:
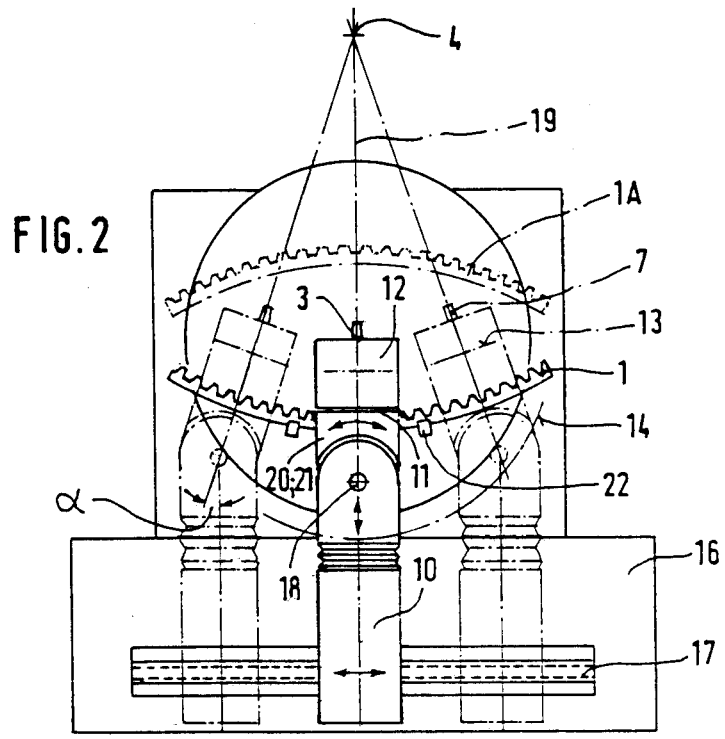
FIG. 2 is a front view of an arrangement corresponding to FIG. 1 for the machining of workpieces chucked in eccentric relation to the workpiece holder for any given machining diameter in accordance with the present invention.

In FIG. 2, the machine bed 16 is shown arranged in accordance with the invention to mount one or more driving elements 10 each of which is movable laterally of the center of holder 2 along a transverse driving element 17 the full width of the bed 16 of the machine. Moreover, in the embodiment illustrated by way of example, the vertical driving element 10 mounts at its tool end a swivelling drive element 18 to transversely position the driving element 12 on guide 11, horizontally. Such horizontal swivel adjustment could be effected from above the guide 11 but is applied to the horizontally displaceable driving element 10 preferably closer to the machine bed 16 to provide a lower center of gravity. Finally, the holder 2 is arranged to carry workpieces 1 in eccentric relation to the holder center 3 whereby the center 4 of a large workpiece or the center of the curve 5 associated therewith may be spaced a substantial distance from the holder center 3 or laterally spaced from the connecting axis 19 between the two axes 3 and 4 as shown in FIG. 4.

The operating positions 6 may accordingly lie outside of concentric circles centered at the holder axis 3 and are located through coordinates y and z geometrically related to the holder center 3 as shown in FIG. 4. The coordinate y is also the vertical distance and z the horizontal distance between adjacent positions of the tool 7 with respect to its drive element axis 13 and holder axis 3, at which positions the tool operations occur. Such y and z distances would be calculated by a data processor, not shown, following each machining operation in response to programmed commands of the machine. Such programmed operations are performed in connection with the arrangement shown in FIG. 2 wherein one driving element 10 and one transverse driving element 17 are provided in perpendicular relation to each other, with possibly a swiveling drive element 18 in order to accomodate the spacing between the two centers 3 and 4 along the connecting axis 19.

The foregoing arrangement also makes possible machining operations on segments or rods along curves of substantial length or straight rods if necessary. Also, the curvature of the path along which formations are machined may be reversed to machine external gears 1A for example as indicated by dotted line in FIG. 2.

In the embodiment illustrated, the machining operations are assumed to be performed along a direction of shift for the horizontal driving element 12 in the viewing plane of FIG. 2, referred to as an X axis. The operating stroke 8 along a Y axis perpendicular to the X axis is achieved by means of an additional stroke driving element 21 associated with the upper portion 20 of the swivel driving element 18, or by means of correspondingly synchronized movements of the two elements 10 and 18.

FIG. 3 is a top view showing the workpiece 1 spaced from holder 2 by spacers 22 so that the tool 7 may undergo its horizontal operational stroke 23 without interference from any surface of the holder 2. The holder 2 may be rotated about its center axis 3 by means of a rotating drive 24. The tool 7 is schematically shown in FIG. 3 with its driving elements 10, 12 and 18 in its normal position for machining gears for example having a workpiece reference axis center 4. The normal position is shown spaced between dotted line positions of the tool 7 on either side thereof a distance z from the holder center 3. The driving means and guides as well as clamps and position indicators, etc. may be respectively constructed in any desired manner.

FIG. 4 by way of example shows the formation of gear teeth along a path having a large radius of curvature without any pivotal adjustment of the tool 7 so that only the workpiece is adjusted to other cutting angles. Such positional adjustment or change may be effected, for example, whenever the workpiece 1 is rotated about its center 4 by the holder 2.

We claim:

1. In apparatus for performing machining operations on a workpiece (1), including a frame (16), a tool (7) engageable with the workpiece, drive means (10,12) effecting programmed displacement of the tool relative to the workpiece through operational strokes in different directions (X,Y,Z) for machining formations thereon, a work holder (2) indexable about an axis (3) the workpiece being mounted thereon and positioning means imparting relative displacement between the tool and the work holder with respect to said indexing axis (3) in synchronism with said programmed displacement for spacing said formations along a predetermined path (5) on the workpiece having a center of curvature (4), the improvement residing in said positioning means including auxiliary drive means (17,18) for radially and tangentially realigning the tool relative to the holder and means (21,24) effecting additional relative displacement between the tool and the holder in one of the directions (Y) for the machining of the formations along said path (5) on the workpiece having the center of curvature (4) thereof radially spaced from the indexing axis (3).

2. The improvement as defined in claim 1 wherein said programmed drive means comprises a pair of linear drive devices (10,12) on which the tool is mounted for said displacement in the two of the different directions (X,Y) which intersect in perpendicular relation to each other, said auxiliary drive means (17,18) effecting displacement in the third different direction (Z) including angular drive means (18) for pivotally interconnecting said pair of linear drive devices and a transverse linear drive device (17) for displacing the interconnected pair of linear drive devices in the third direction (Z).

3. The improvement as defined in claim 2 wherein the additional displacement means includes rotational drive means (24) connected to the holder for rotation of the workpiece about said indexing axis (3) in eccentric relation to the reference axis (4).

4. The improvement as defined in claim 2, wherein the means effecting said additional displacement in said one of the two different directions (Y) comprises linear drive means (21) connected to said pair of interconnected linear drive devices (10, 12) for imparting said additional displacement thereto.

5. The apparatus as defined in claim 2, wherein said workpiece is a gear blank and said formations are gear teeth.

6. The apparatus as defined in claim 5, wherein said tool is a gear cutter rotatable about an axis (13) displaceable relative to the holder (2) in said three different directions (X,Y Z).

7. The improvement as defined in claim 1 wherein the additional displacement means includes rotational drive means (24) connected to the holder for rotation of the workpiece about said indexing axis (3) in eccentric relation to the reference axis (4).

8. The improvement as defined in claim 7, wherein said tool is rotatable about an axis (13) displaceable relative to the indexing axis (3) about which the holder is rotatable by the rotational drive means (24).

9. The improvement as defined in claim 8, wherein the axis (13) of the tool is displaceable in two of said different directions.

10. The apparatus as defined in claim 1 wherein the curvature (19) of the path (5) has a radius greater than the maximum radial distance (4-14) from the reference axis to which the operational strokes are limited in said one of the two directions (Y).

11. The apparatus of claim 1 wherein said workpiece is a gear blank and said holder is an indexing head rotatable about said indexing axis.

12. In a method of machining a workpiece (1) by means of a tool (7) displaced through operational strokes in at least two different directions (X,Y) relative to the workpiece while positioned on a holder (2) having an indexing axis (3) limiting the operational stroke of the tool in one of the two directions (Y) to a maximum radial distance from said axis, said displacement of the tool through the operational strokes being synchronized with programmed relative displacement between the tool and the holder to machine formations at spaced locations (6,6A) on the workpiece, the improvement including the steps of: realigning said tool relative to the holder; imparting additional relative displacement between the tool and holder in said one of the two different directions (Y); and synchronously programming said additional displacement and the realignment of the tool to perform the machining of the formations at said locations along a curved path (5) on the workpiece having a radius of curvature greater than said maximum radial distance when the center of said curvature and the indexing axis do not coincide.

13. The improvement as defined in claim 12, wherein said step of realigning the tool includes angular displacement thereof about an axis (18) parallel to the center of said curvature (4) in eccentric relation to the indexing axis and linear displacement of the tool in said one direction (Y).

14. The improvement as defined in claim 12 wherein said step of realigning the tool includes angular displacement of the tool about an axis (18) parallel to the a center of said curvature (4) spaced from the indexing axis and rotation of the holder about the indexing axis.

15. The method of claim 14 wherein the indexing axis (3) is radially spaced from the reference axis (4) a distance greater than the maximum distance (4-14) to which the operational strokes of the tool are limited in said one of the two directions (Y).

16. A method of manufacturing large gears on a gear cutting machine having a cutting tool (7) and a holder (2) having a center axis (3), including the steps of: securing a gear blank (1) to the holder for displacement therewith relative to the tool between indexed positions about said axis (3); machining gear formations at locations (6,6A) on the blank in the indexed positions by movements of the tool through operational strokes relative to the holder; and realigning the tool relative to the holder between said machining movements for establishing said locations along a curved path (5) having a center of curvature (4) spaced from the center axis of the holder.

* * * * *